US012272037B2

(12) United States Patent
Yang et al.

(10) Patent No.: US 12,272,037 B2
(45) Date of Patent: Apr. 8, 2025

(54) DUAL-MODE RESTORATION MICROSCOPY

(71) Applicant: Charité-Universitätsmedizin Berlin, Berlin (DE)

(72) Inventors: Li-Ling Yang, Berlin (DE); Christian Conrad, Berlin (DE); Foo Wei Ten, Berlin (DE); Roland Eils, Berlin (DE)

(*) Notice: Subject to any disclaimer, the term of this patent is extended or adjusted under 35 U.S.C. 154(b) by 231 days.

(21) Appl. No.: 17/800,225

(22) PCT Filed: Feb. 17, 2021

(86) PCT No.: PCT/EP2021/053904
§ 371 (c)(1),
(2) Date: Aug. 17, 2022

(87) PCT Pub. No.: WO2021/165330
PCT Pub. Date: Aug. 26, 2021

(65) Prior Publication Data
US 2023/0069794 A1    Mar. 2, 2023

(30) Foreign Application Priority Data
Feb. 17, 2020  (EP) ..................... 20157777

(51) Int. Cl.
G06T 5/00      (2024.01)
G02B 21/06     (2006.01)
(Continued)

(52) U.S. Cl.
CPC ............... G06T 5/80 (2024.01); G02B 21/06
(2013.01); G02B 21/367 (2013.01); G06T 5/50
(2013.01);
(Continued)

(58) Field of Classification Search
None
See application file for complete search history.

(56) References Cited

U.S. PATENT DOCUMENTS 11,521,301 B2 * 12/2022  Klaiman ............... G06T 5/77
2010/0183217 A1 *  7/2010  Seung .................. G06T 5/60
                                                382/156
(Continued)

OTHER PUBLICATIONS

Belthangady Chinmay et al, "Applications, promises, and pitfalls of deep learning for fluorescence image reconstruction", Jul. 8, 2019 (Jul. 8, 2019), vol. 16, No. 12, p. 1215-1225.
(Continued)

Primary Examiner — Mohammad J Rahman
(74) Attorney, Agent, or Firm — JMB Davis Ben-David

(57) ABSTRACT

A microscope system (100) configured to record images in at least a first and a second imaging mode (501, 502), comprising: An objective (1) collecting light (201) from a sample (11), An illumination module coupled to the objective, A first reimaging objective (5) generating an intermediate image of the sample and a second reimaging objective (6) that relays the intermediate image onto a detection module, An evaluation module (200) comprising a machine learning method (DL), trained with a first and a second set of images of the same sample, wherein the first and second set has been acquired in the first (501) and second imaging mode (502), respectively, wherein upon acquisition of an image (400) in the second imaging mode (502) the trained machine learning method (DL) outputs a restored image (401) that comprises fewer aberrations than the image (400) acquired in the second imaging mode (52, 53, 57).

14 Claims, 6 Drawing Sheets

Figure 1:
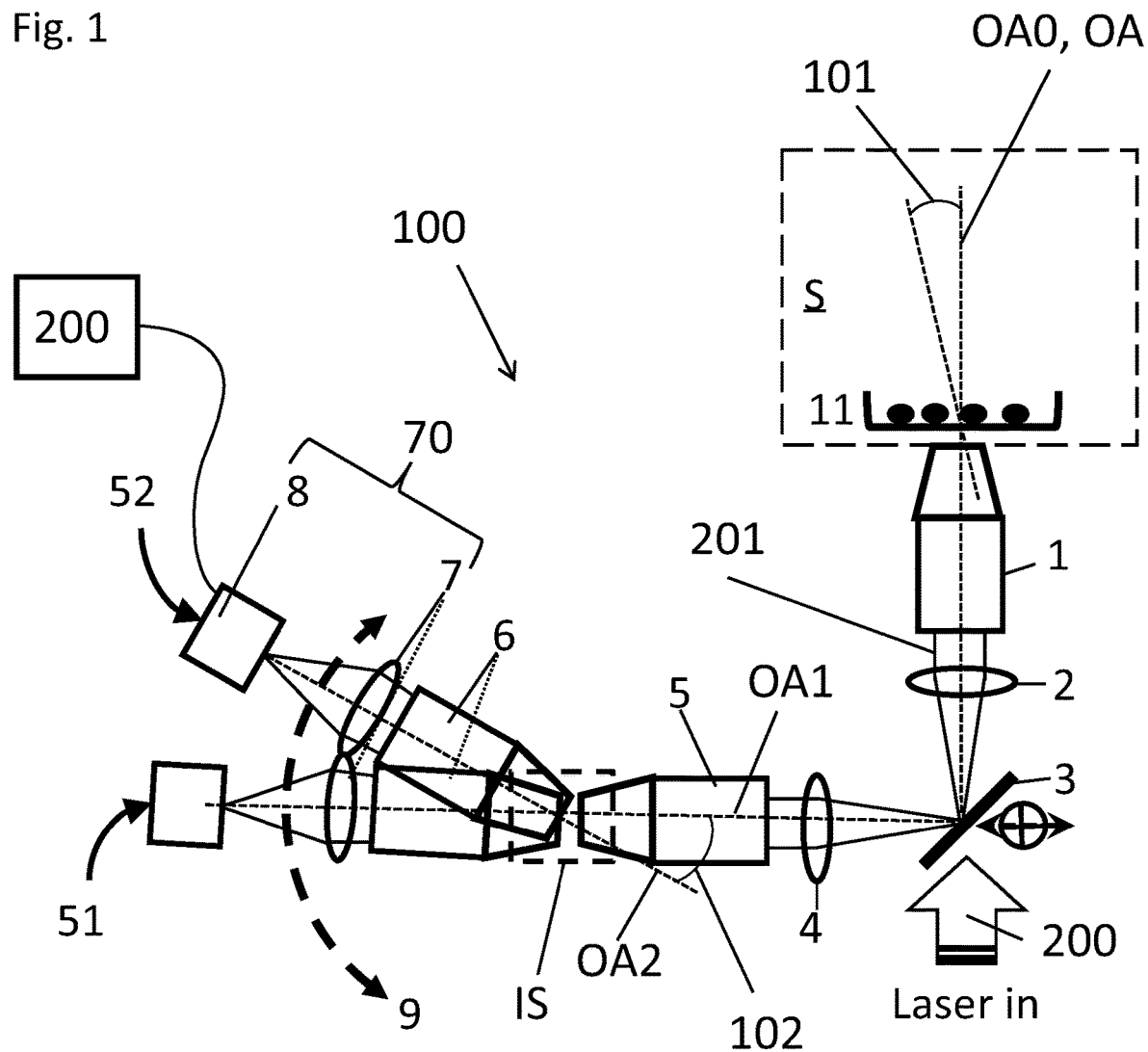

(51) Int. Cl.
- *G02B 21/36* (2006.01)
- *G06T 5/50* (2006.01)
- *G06T 5/80* (2024.01)
- *G06T 7/00* (2017.01)
- *H04N 5/225* (2006.01)
- *H04N 5/235* (2006.01)
- *H04N 23/56* (2023.01)
- *H04N 23/74* (2023.01)
- *H04N 5/262* (2006.01)

(52) U.S. Cl.
CPC ........... *G06T 7/0002* (2013.01); *H04N 23/56* (2023.01); *H04N 23/74* (2023.01); *G06T 2207/10056* (2013.01); *G06T 2207/20081* (2013.01); *G06T 2207/20084* (2013.01); *G06T 2207/20221* (2013.01); *G06T 2207/30168* (2013.01); *H04N 5/2628* (2013.01)

(56) References Cited

U.S. PATENT DOCUMENTS

| | | | | |
|---|---|---|---|---|
| 2014/0016843 | A1* | 1/2014 | Zhang | G06V 20/698 382/129 |
| 2019/0196172 | A1 | 6/2019 | Hillman | |
| 2019/0333199 | A1* | 10/2019 | Ozcan | G06T 5/70 |
| 2019/0385282 | A1* | 12/2019 | Sasaki | G06T 5/50 |
| 2021/0342569 | A1* | 11/2021 | Sieckmann | G06N 20/00 |
| 2021/0342636 | A1* | 11/2021 | Sieckmann | G06F 18/214 |
| 2022/0058776 | A1* | 2/2022 | Ozcan | G06T 3/4046 |

OTHER PUBLICATIONS

Yair Rivenson et al, "Toward a Thinking Microscope: Deep Learning in Optical Microscopy and Image Reconstruction", Arxiv.org, Cornell University Library, 201 Olin Library Cornell University Ithaca, NY 14853, May 23, 2018 (May 23, 2018).

De Haan Kevin et al, "Deep-Learning-Based Image Reconstruction and Enhancement in Optical Microscopy", Jan. 1, 2020 (Jan. 1, 2020), vol. 108, No. 1, p. 30-50.

Nguyen Trung D et al, "Single-objective multiphoton light-sheet microscopy for tumor organoid screening", Progress in Biomedical Optics and Imaging, SPIE—International Society for Optical Engineering, Bellingham, WA, US, vol. 10882, Feb. 22, 2019 (Feb. 22, 2019), p. 108822P-108822P.

Dunsby, C. "Optically sectioned imaging by oblique plane microscopy." Optics express 16.25 (2008): 20306-20316.

* cited by examiner

(A) In-line view training

(B) Oblique view training

(C) Oblique view training by external imaging module

A) Angular stage in x

B) Angular stage in z

DUAL-MODE RESTORATION MICROSCOPY

CROSS-REFERENCE TO RELATED APPLICATIONS

This is the U.S. National Stage of International Patent Application No. PCT/EP2021/053904 filed on Feb. 17, 2021 which in turn claims the benefit of European Patent Application No. 20157777.2 filed on Feb. 17, 2020.

SPECIFICATION

The invention relates to a microscope system configured to record images in at least a first and a second imaging mode, such as confocal imaging, wide field imaging, or oblique angle illumination.

Light sheet microscopes are known in the art. Particularly light sheet microscopes that generate the light sheet at an oblique angle with an optical axis of the sample imaging objective, such that a single objective can be used for illumination and light collection have gained increase attention.

However, a drawback of such oblique angle illumination microscopes is that the illuminated light sheet extends at an illumination angle smaller than 90°, particularly in the range of 45 to 60°, with respect to the optical axis of the sample imaging objective. This illumination angle requires a reimaging step in the microscope that images the sample space particularly the illuminated plane to an intermediate image in an intermediate image space. The reimaging is achieved by means of a first reimaging objective that essentially images the sample space without effective magnification, i.e. the magnification of the sample space and the intermediate image space equals one; otherwise the intermediate image comprises a number of optical aberrations due to the magnification smaller or larger one.

The microscopes for oblique light sheet illumination further comprise a second reimaging objective arranged at a reimaging angle with respect to the optical axis of the first reimaging objective, wherein the reimaging angle is chosen such that the intermediate image plane that is tilted according to the oblique illumination angle, extends orthogonal to the optical axis of the second reimaging objective. This allows for imaging the sample under the oblique illumination conditions without aberrations.

There are several disadvantages that come with such a setup. First, the optical quality requirement for the first reimaging objective increase as the optical quality of sample imaging objective increase. Typically, high-magnification, high NA-objectives are used for the sample imaging objective and thus, similar objectives are used for reimaging, even though consideration regarding working distance for the second reimaging objective might limits the available numerical aperture for the second reimaging objective.

Second, as the reimaging of the intermediate image is achieved at a reimaging angle, a substantial amount of light is not collected by the second reimaging objective, severely limiting the use of such microscopes for light sensitive applications, and also limiting the spatial resolution. The latter is caused by a reduction of an effective numerical aperture of the microscopes, as due to the reimaging angle some of the light cone cannot be recollected by the second reimaging objective.

Thus, oblique light sheet illumination microscopes by design suffer from a reduced effective numerical aperture. Usually, a maximum effective numerical aperture of such microscopes is limited to 0.76, even though the sample illumination (oil immersion) objective might provide a numerical aperture of 1.4.

In the art several alternative solutions are provided that address one or the other problem.

For example, WO 2017/210159 A1 discloses a microscope where the camera is placed in the intermediate image plane. As the pixel size of the camera is in the range of several microns, any resulting image would suffer from poor resolution due to said pixel size. Therefore, a non-isotropic magnification is applied for generating the intermediate image, particularly by means of cylindrical reimaging objectives. To increase the low resolution, a pair of cylindrical optical elements is introduced in the detection arm of the microscope to increase the intermediate magnification non-isotropically, while reducing the image distortion. However, the image distortion stemming from the non-neutral magnification between sample space and intermediate image space, i.e. a magnification larger or smaller than 1, aberration-free 3D imaging can not be achieved to full extend. The effective numerical aperture of such a microscope is typically far below 0.7, particularly in the order of 0.4.

It is an object of the invention to overcome the limitations.

This object is achieved by the system having the features of claim 1.

Advantageous embodiments are described in the subclaims.

According to claim 1 a microscope system is provided, wherein the microscope system is configured to record images in at least a first and a second imaging mode, such as confocal imaging, wide field imaging, or selective plane oblique angle illumination, or superresolution imaging, wherein the microscope comprises the components of:

An illumination module configured and arranged to emit light, particularly in the UV, visible and/or infrared spectrum to a sample imaging objective for illuminating the sample space, The sample imaging objective arranged to provide the light from the illumination module to a sample space of the microscope system and to collect light, particularly fluorescent light from a sample arranged in the sample space, wherein an optical axis of the system aligns with an optical axis of the sample imaging objective, A first and a second reimaging objective, wherein an optical axis of the first reimaging objective aligns with the optical axis of the system, and wherein the first reimaging objective is arranged and configured to generate an intermediate image of the sample space in an intermediate image space and wherein the second reimaging objective is arranged and configured to image the intermediate image of the first reimaging objective, A detection module arranged and configured to detect and record light collected by the second reimaging objective, wherein the detection module is arranged along an optical axis of the second reimaging objective, An evaluation module, such as a computer, comprising a trained machine learning method, such as a trained deep learning network, wherein the machine learning method, particularly the deep learning network is trained with a first set of images of a sample and a second set of images of the same sample, wherein the first set of images has been acquired in the first imaging mode of the microscope system and wherein the second set has been acquired in the second imaging mode of the microscope system, wherein particularly after configuration of the machine learning method, particularly after training of the deep learning network, upon acquisition of an image in the second imaging mode the configured machine learning method, particularly the trained deep learning network is configured to generate and to output a restored image from the image acquired in the second imaging mode, wherein the restored image comprises fewer aberrations than the image acquired in the second imaging mode.

Aberrations are particularly optical aberrations such as spherical aberrations, aberrations due to refractive index mismatch, astigmatism, or aberration stemming from an effective magnification of the sample space with respect to the intermediate image space, particularly when the second imaging mode is an oblique imaging mode.

According to an embodiment of the invention, the images acquired in the first imaging mode comprise less optical aberrations or a higher optical resolution than images acquired in the second imaging mode.

According to another embodiment of the invention, the illumination module comprises a light source and optical components for providing a spatial light distribution for generating at least an oblique light sheet illumination and/or a wide field illumination.

The microscope system can comprise additional components for positioning the illumination of the illumination module relative to the sample imaging objective.

According to another embodiment of the invention, the sample imaging objective is an immersion objective with a numerical aperture larger than one.

According to another embodiment of the invention, the microscope system comprises a sample stage for holding a sample or for holding a sample holder.

It is noted that the term "alignment" with respect to the optical axes of the sample imaging objective, the microscope system, as well as the first and the second reimaging objective, and potentially other components of the microscope system, particularly refers to the optical path rather than the geometrical path. The optical path can be folded e.g. by one or more mirrors such that geometrically the optical axes are not aligned while optically the optical axes are aligned.

According to another embodiment of the invention, the first and/or the second reimaging objective are an air objective.

According to another embodiment of the invention, the first reimaging objective is arranged in the microscope system such that it generates an image of the sample space.

According to another embodiment of the invention, a pair of relay lenses are arranged in a 4f configuration between the sample imaging objective and the first reimaging objective, wherein the relay lenses image a pupil plane of the sample imaging objective.

According to another embodiment of the invention, an effective magnification of the sample space and the intermediate image space is larger or smaller than one, particularly only in the second imaging mode.

Figure 6:
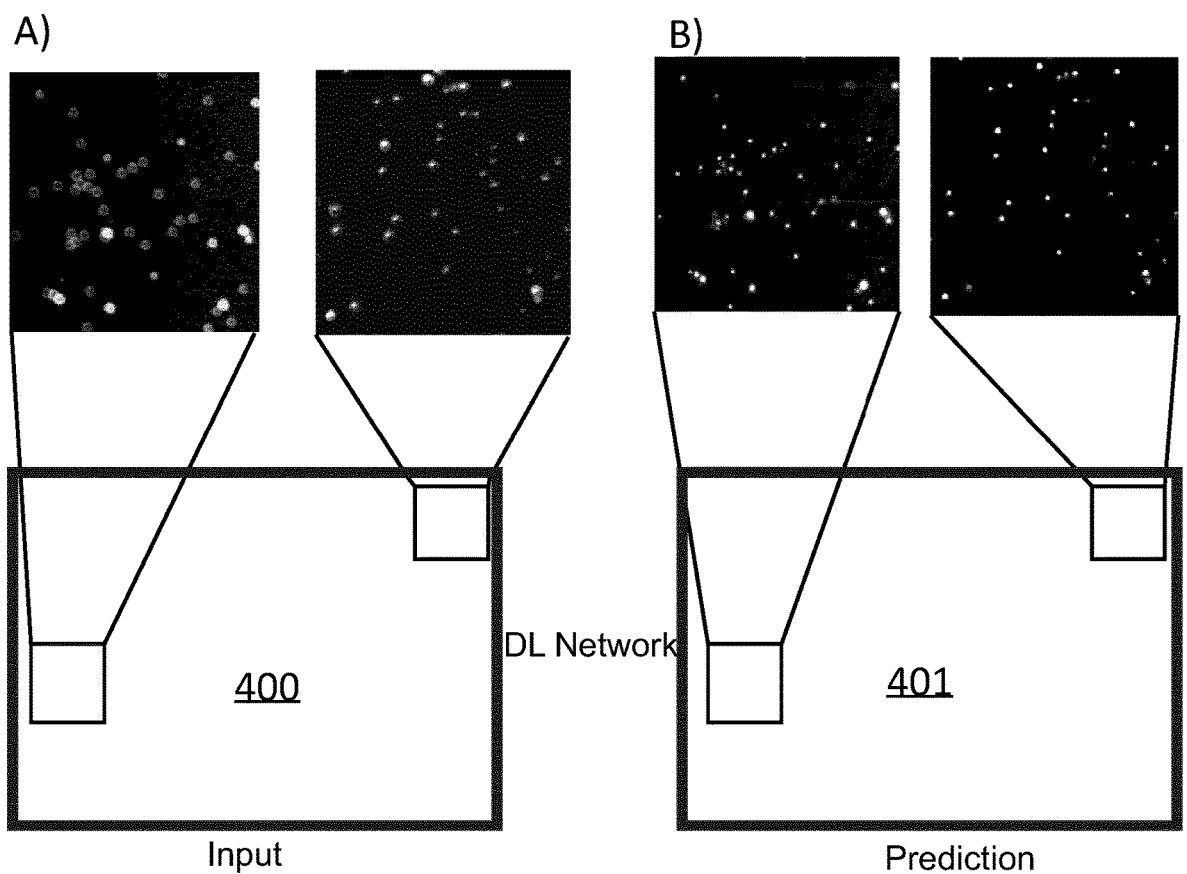

Particularly, if one of the imaging modes is an oblique light sheet imaging mode, having an effective magnification of the intermediate image space is different to one, May introduce spatially varying aberrations across the field of view of the microscope system, i.e. the intermediate image space (c.f. e.g. FIG. 6).

Machine learning as known in the art addresses only spatially constant or slightly varying aberrations, as for example occurring in a 90° light sheet illumination, which is discussed in Belthangady Chinmay Et al, "Applications, promises and pitfalls of deep learning for fluorescence image reconstruction", Nature methods, Vol 16, no 12, 8 Jul. 2019. Also, Yair Rivensan et al, "Toward a thinking microscope: Deep Learning in optical microscopy and image restoration".arxiv.org, Cornell University Library, 23 May 2018 (2018 May 23), XP081139811, DOI: 10.13'64/OPN.29.7000034 allows correction of homogenous aberrations across the field of view only. Both publications deal with a restoration of image planes that extend perpendicular to the optical axis of the system and not to an oblique illumination sheet, which complicates the situation dramatically. Moreover, having an effective magnification different to one the situation becomes even more complex as the aberrations are amplified by this magnification mismatch. The combination of a machine learning method with an oblique light sheet imaging mode that on top of the inherent aberrations, increases aberrations strength, when a mismatch of effective magnification is introduced, yields a synergetic effect of the system according to the invention, as two problems are solved by applying a single inventive concept.

According to an embodiment of the invention, the first reimaging objective generates the intermediate image.

According to another embodiment of the invention, the detection module comprises an array detector such as a camera for recording the light, particularly the filtered light collected by the second reimaging objective.

According to another embodiment of the invention, the detection module comprises a point detector, or an array of point detectors.

According to another embodiment of the invention, the system comprises a scanning module for scanning illumination light across the sample space or for adjusting the illumination angle.

According to another embodiment of the invention, the machine learning method, particularly the trained deep learning network, is an artificial neural network (ANN), comprising an input layer of neurons for receiving an acquired image, an output layer for outputting a restored image, and at least one hidden layer for processing the restoration.

According to an embodiment of the invention, the artificial neural network is a convolutional neural network.

According to another embodiment of the invention, the machine learning method, particularly the deep learning network is stored on the evaluation module, particularly wherein the evaluation module comprises a data storage for storing images and for storing the machine learning method, particularly the deep learning network as well as a processor executing the machine learning method, particularly the deep learning network.

According to another embodiment of the invention, the evaluation module is configured to execute the machine learning method, wherein the machine learning method is a computer-implemented method, wherein when the machine learning method is executed in the computer, an image provided to the machine learning method is restored according to the invention.

According to another embodiment of the invention, the first set of images acquired with the first imaging mode has a fewer aberrations and/or a higher optical resolution than the second set of images acquired with the second imaging mode.

According to another embodiment of the invention, an image acquired in the first imaging mode has a fewer aberrations and/or a higher optical resolution than an image acquired in the second imaging mode.

According to another embodiment of the invention, the first imaging mode is a wide field imaging mode and the second imaging mode as an oblique light sheet illumination mode.

According to another embodiment of the invention, the microscope system is configured to adopt particularly repeatedly and/or automatically the first and the second imaging mode.

According to another embodiment of the invention, the microscope system is configured to adopt particularly repeatedly and/or automatically a first illumination mode, such as a wide field illumination mode and a second illumination mode, such as an oblique selective plane illumination mode, wherein in the first illumination mode an optical axis of the illumination system and the sample imaging objective align and in the second illumination mode an oblique light sheet illumination is generated in the sample space such that illumination propagates along an illumination angle larger than 0°, particularly wherein said illumination angle is between 45° and 60° relative to the optical axis of the sample imaging lens, wherein the microscope system is further configured and arranged to adopt a first detection mode and a second detection mode, wherein in the first detection mode an optical axis of the second reimaging objective aligns with the optical axis of the first reimaging objective, wherein in the second detection mode the optical axis of the second reimaging objective encloses a reimaging angle larger than 0°, particularly between 30° and 45° with the optical axis of the first reimaging objective, wherein the first imaging mode comprises a combination of the first or the second illumination mode with the first or the second detection mode and wherein the second imaging mode comprises another combination of the first or the second illumination mode with the first or the second detection mode.

According to another embodiment of the invention, the illumination angle is 0° when an average propagation direction of the light in the sample space is parallel to the optical axis of the sample imaging objective According to another embodiment of the invention, the reimaging angle is 0° when an average propagation direction of the light in the intermediate image space is parallel to the optical axis of the first reimaging objective.

Illumination angles and reimaging angles larger than 0° are measured between the optical axis of the respective objective or lens and an average propagation direction of the light.

According to another embodiment of the invention, the microscope system is configured to adopt a wide field illumination mode, wherein in the wide field illumination mode illumination light essentially propagates parallel to the optical axis of the sample imaging objective in the sample space, i.e. the illumination angle is 0°.

According to another embodiment of the invention, the microscope system comprises or is configured to adopt a wide field detection mode, wherein in the wide field detection mode the optical axes of the first and the second reimaging objectives are aligned, i.e. the reimaging angle is 0°.

According to another embodiment of the invention, the microscope system is configured to adopt an oblique illumination mode, wherein in the oblique illumination mode illumination light essentially propagates along an oblique light sheet in the sample space, wherein said light sheet encloses the illumination angle with the optical axis of the sample imaging objective, i.e. the illumination angle is larger than 0°.

According to another embodiment of the invention, the microscope system comprises or is configured to adopt an oblique detection mode, wherein in the oblique detection mode the optical axes of the first and the second reimaging objectives enclose the reimaging angle larger 0°.

According to an embodiment of the invention, the first imaging mode comprises the wide field illumination mode and the wide field detection mode.

According to an embodiment of the invention, the first imaging mode comprises the oblique illumination mode and the oblique detection mode.

According to an embodiment of the invention, the second imaging mode comprises the oblique illumination mode and the oblique detection mode.

According to an embodiment of the invention, the second imaging mode comprises the oblique illumination mode and the wide field detection mode.

The term "configured machine learning method" and "trained deep learning network" refer to a configuration step for configuring the machine learning method to restore the images. For deep learning networks, this process is referred to as "training". For sake of simplicity the expression "training" will be also used in connection with configuring the machine learning method, even though the configuration process of the machine learning method might not rely on training. Thus, the term "configured machine learning method" and "trained machine learning method" are used synonymously in the context of the specification.

According to another embodiment of the invention, the microscope system is configured to adopt a third imaging mode, wherein the third imaging mode comprises yet another combination of the first or the second illumination mode with the first or the second detection mode than the first imaging mode and the second imaging mode, and wherein upon acquisition of an image in the third imaging mode, the machine learning method, particularly the deep learning network that has been trained with the first set and the second set of images is configured to generate and to output a restored image from the image acquired in the third imaging mode, wherein the restored image comprises fewer aberrations than the image acquired in the third imaging mode.

According to another embodiment of the invention, an intermediate magnification, particularly an intermediate lateral magnification of the sample space in the intermediate image space is smaller than one, particularly smaller than 0.9 more particularly smaller than 0.8, particularly wherein the intermediate magnification is smaller than one, when the microscope system adopts the second illumination mode together with the second detection mode, wherein the configured machine learning method, particularly the trained deep learning network is configured/trained such that any optical aberration that is caused by the intermediate magnification being smaller than one is compensated in the restored image.

The term "magnification" particularly refers to an isotropic magnification orthogonal to the optical axis. Magnification along the optical axis might differ from the lateral magnification, i.e. the magnification orthogonal to the optical axis. However, if the lateral magnification equals one, then also the axial magnification might be one.

The term "intermediate magnification" particularly refers to a magnification between the sample space and the intermediate image space, i.e. a magnification that is defined by all optical elements that are particularly arranged between the sample space and the intermediate image space.

The term "effective magnification" particularly refers to the resulting magnification taking into account all optical components that contribute to the magnification These optical components particularly comprise the sample imaging objective and the first reimaging objective. Particularly, additional lenses, such as relay lenses, telecentric system lenses or the like that are arranged optically between the sample imaging objective and the first reimaging objective can contribute to the intermediate magnification.

According to another embodiment of the invention, the reimaging angle is smaller than the illumination angle, particularly wherein the reimaging angle is smaller than 30°, particularly smaller than 25°, more particularly smaller than 22°, particularly wherein the reimaging angle is 21.3° with the illumination angle being in the range of 50° to 70°, particularly 60°, particularly wherein the intermediate magnification is between 0.5 and 0.8, more particularly between 0.6 and 0.7, particularly wherein the intermediate magnification equals to 0.67 and the sample imaging objective is an 63×NA1.2 water immersion objective and wherein the first reimaging objective is an air objective, particularly wherein a sum of the reimaging angle and the illumination angle is smaller than 90°, particularly smaller than 80°, particularly wherein if the illumination angle is 45° the reimaging angle is smaller than 45°, particularly wherein if the illumination angle is 60° the reimaging angle is smaller than 30°, particularly smaller than 25°.

Particularly when magnification is smaller than one, the reimaging angle can be smaller than the illumination angle and thus, more light can be collected by the second reimaging objective providing a more light sensitive microscopes system and a higher optical resolution.

According to another embodiment of the invention, an effective numerical aperture of the microscope system is larger than 0.6, particularly larger than 0.7, more particularly larger than 0.8, even more particularly larger than 0.9.

The effective numerical aperture particularly refers to a cumulated numerical aperture of all imaging and reimaging components of the microscope system, particularly taking into account the adopted reimaging angle and/or the adopted illumination angle of the microscope system.

In the art, using the oblique detection mode, the reimaging of the intermediate image space causes the effective numerical aperture of the system to be reduced, as the second reimaging objective misses a considerable amount some of the light projected by the first reimaging objective due to the reimaging angle.

According to the invention, this problem is particularly solved by adopting smaller reimaging angles than illumination angles and/or non-neutral magnification, such that a larger amount of light can be recollected by the second reimaging objective.

Resulting aberrations from the deviation of a neutral intermediate magnification, i.e. a magnification that equals one, are compensated and corrected for by the the machine learning method, particularly the deep learning network.

According to another embodiment of the invention, the reimaging angle is smaller than the illumination angle and the intermediate magnification is smaller than one, particularly wherein a sum of the reimaging angle and the illumination angle is smaller than 90°, particularly smaller than 80°.

According to another embodiment of the invention, the microscope system is configured to adopt at least two illumination angles different to 0°, particularly wherein the first and the second illumination angle are between 30° and 60°.

Each of the illumination angles can be considered a different first and/or second illumination mode.

According to another embodiment of the invention, the microscope system is configured to adopt at least two reimaging angles different to 0°, particularly wherein the first and the second reimaging angle are between 15° and 45°.

Each of the reimaging angles can be considered a different first and/or second detection mode.

According to another embodiment of the invention, the microscope system is configured to adopt at least a first and a second azimuthal illumination angle when the microscope system adopts the second illumination mode, particularly when the illumination angle is different to 0°, wherein first and the second azimuthal illumination angle each cover an area comprised by a plane orthogonal to the optical axis of the sample imaging objective, particularly wherein the first and the second azimuthal illumination angle differ by at least 60°, particularly by at least 90°, more particularly by 180°, particularly wherein the illumination angle is the same for the first and the second azimuthal illumination angle.

According to another embodiment of the invention, the microscope system is configured to adopt at least a first and a second azimuthal reimaging angle when the microscope system adopts the second detection mode, particularly when the reimaging angle is different to 0°, wherein first and the second azimuthal reimaging angle each cover an area comprised by a plane orthogonal to the optical axis of the first reimaging objective, particularly wherein the first and the second azimuthal reimaging angle differ by at least 45°, particularly by at least 90°, more particularly by 180°, particularly wherein the reimaging angle is the same for the first and the second azimuthal reimaging angle.

This embodiment allows the recording of oblique light sheet images for image fusion applications.

According to another embodiment of the invention, the microscope system is configured to acquire for each of the at least two azimuthal illumination angle and each corresponding azimuthal reimaging angle an image.

While there are several possible combinations for illumination and reimaging configurations for different azimuthal illumination and reimaging angles, obviously there are corresponding azimuthal illumination and reimaging angles wherein the second reimaging objective is positioned such that sufficient light is collected and restoration of the acquired image is possible.

According to another embodiment of the invention, the evaluation module or an additional computer that is particularly not comprised by the evaluation module is configured to generate a multi-view fusion image from the at least two images acquired with a combination of two different azimuthal illumination and reimaging angles, by fusing the acquired images, wherein the multi-view fusion image has a higher spatial resolution than the single images recorded with the azimuthal illumination angle and the corresponding azimuthal reimaging angle.

According to another embodiment of the invention, the microscope system is configured such that either each recorded image for each imaging mode comprising imaging with one of the azimuthal illumination and reimaging angles is restored prior to fusion by the the machine learning method, particularly the deep learning network or wherein the the machine learning method, particularly the deep learning network is trained and configured to restore the fused image.

According to another embodiment of the invention, relay lenses are arranged optically between the sample imaging objective and the first reimaging objective, wherein the relay lenses are configured such that the intermediate magnification is smaller than one.

According to another embodiment of the invention, the microscope system comprises an additional imaging module for generating images associated to the first imaging mode, wherein the additional imaging module shares in term of a common light path at least the sample imaging objective of the system, wherein the additional imaging module is a
- confocal imaging module configured to record confocal images from a sample in the sample space,
- a superresolution microscopy module configured to generate superresolution images, such as a STED, STORM, PALM or SOFI, SIM module.

The term "superresolution" particularly refers to the generation of images that have an optical resolution better than the recorded images, particularly below the diffraction limit and that are acquired not in a near-field illumination or detection scheme, such as NSOM (Near-Field Scanning Optical Microscopy).

The term "STED" particularly refers to stimulated excitation depletion microscopy.

The term "STORM" particularly refers to stochastic optical reconstruction microscopy.

The term "PALM" particularly refers to photoactivated localization microscopy.

The term "SOFI" particularly refers to superresolution optical fluctuation microscopy.

The term "SIM" particularly refers to structured illumination microscopy.

Particularly for the acquisition for superresolution images with a STORM, PALM or SOFI module, a light sensitive camera, particularly single-photon sensitive camera might be comprised by the superresolution module. The module might also comprise a computer with a computer-program configured to generate the superresolution images.

A STED module particularly comprises a beam illumination unit configured to provide a STED illumination, for example by use of a "STED-doughnut"-shaping element, such as a STED-tailored phase plate.

The confocal imaging module, particularly comprises additional components such as an illumination module for providing a focused illumination spot in the sample space, a confocal pinhole and point detector, as well as a scanner.

Alternatively, two-photon excitation can be provided by the confocal module.

According to another embodiment of the invention, the the machine learning method, particularly the deep learning network is or has been trained by at least one of the following combinations of imaging modes, wherein the first set of images acquired in the first imaging mode is a ground truth for the the machine learning method, particularly the deep learning network training and the second set of images acquired in the second imaging mode is a source for the the machine learning method, particularly the deep learning network input:
a. the first imaging mode consists of a the first illumination mode, particularly the wide field illumination mode and the first detection mode, particularly the wide field detection mode, and wherein the second imaging mode consists of the second illumination mode for oblique illumination, particularly the oblique illumination mode, and the first detection mode, particularly the wide field illumination mode, particularly wherein the third imaging mode consists of the second illumination mode, particularly the oblique illumination mode, and the second detection mode, particularly the oblique detection mode;
b. the first imaging mode consists of a the second illumination mode, particularly the oblique illumination mode, and the second detection mode, particularly the oblique detection mode, and wherein the second imaging mode consists of the second illumination mode for oblique illumination, particularly the oblique illumination mode, and the first detection mode, particularly the wide field detection mode, particularly wherein the third imaging mode consists of the second illumination mode, particularly the oblique illumination mode, and the second detection mode, particularly the oblique detection mode;
c. the first imaging mode consists of the first illumination mode, particularly the wide field illumination mode, and the first detection mode, particularly the wide field illumination mode, and wherein the second imaging mode consists of second illumination mode for oblique illumination, particularly the oblique illumination mode, and the second detection mode, particularly the oblique detection mode;
d. the first imaging mode consists is an imaging mode provided by the additional imaging module, and wherein the second imaging mode consists of second illumination mode for oblique illumination, particularly the oblique illumination mode, and the second detection mode, particularly the oblique detection mode, particularly wherein the restored image generated by the machine learning method, particularly the deep learning network comprises a higher optical resolution than the image acquired in the second imaging mode.

According to another aspect of the invention, a method for restoring a microscope image acquired on a microscope system according to the invention is provide, the method comprising at least the steps of:
Train a machine learning method, particularly a deep learning network with a first set and a second set of images corresponding to a first and a second imaging mode of the microscopes system;
Acquiring an image in the second imaging mode;
Restoring the acquired image with the trained machine learning method such that the restored image comprises fewer aberrations and/or a higher optical resolution than the acquired image.

It is noted that term and definitions as well as embodiments from the microscope system apply in the similar fashion to the method and can be used for elaborating on the method and serve for additional method claims.

The method is particularly a computer-implemented method, that when executed on a computer executes the method steps.

Particularly, exemplary embodiments are described below in conjunction with the Figures. The Figures are appended to the claims and are accompanied by text explaining individual features of the shown embodiments and aspects of the present invention. Each individual feature shown in the Figures and/or mentioned in said text of the Figures may be incorporated (also in an isolated fashion) into a claim relating to the device according to the present invention.

It is shown in

Figure 2:
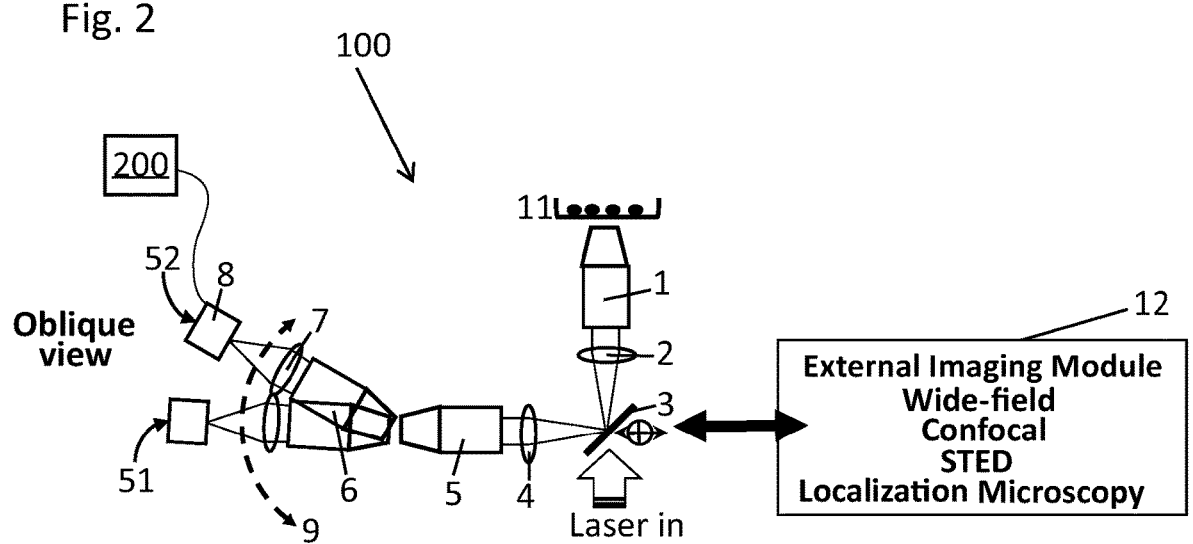
Figure 3:
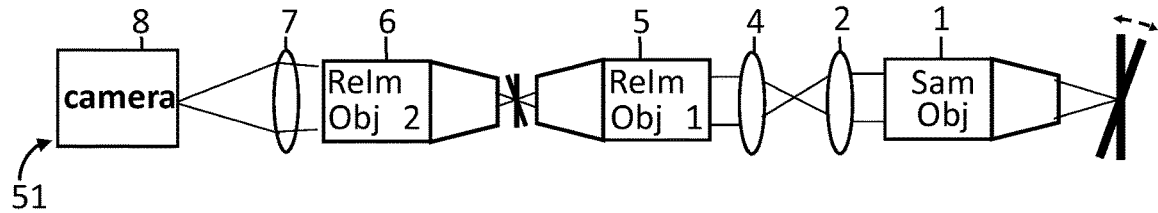
Figure 3:
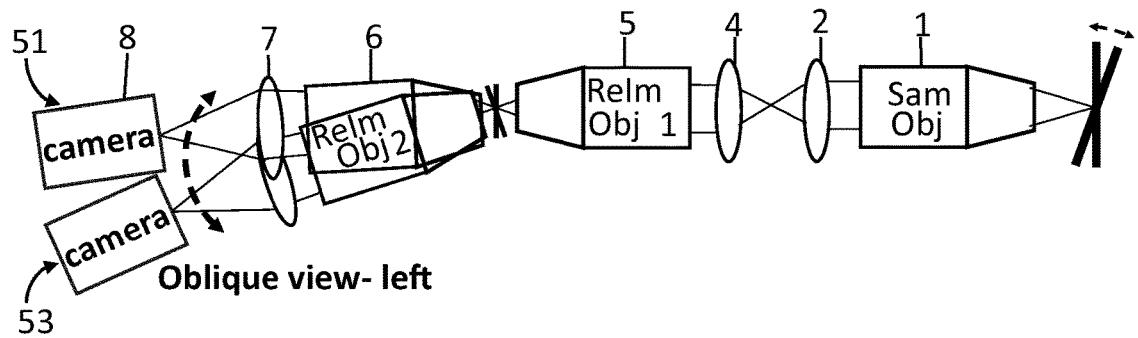
Figure 3:
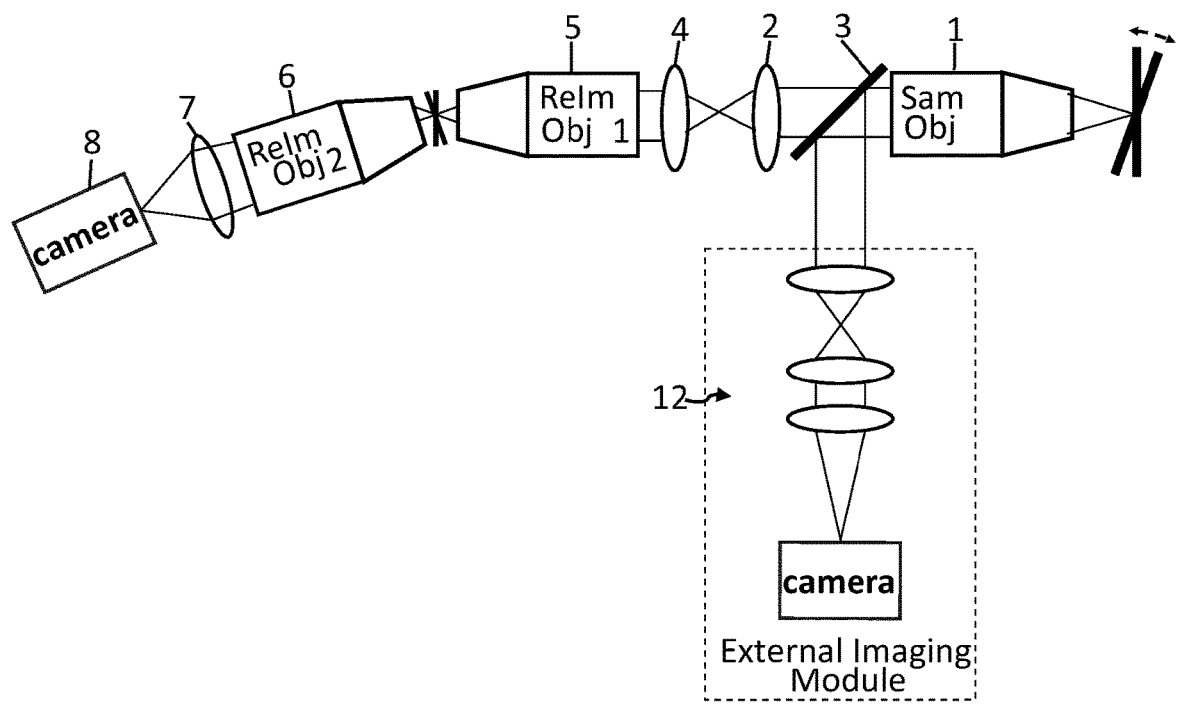
Figure 4:
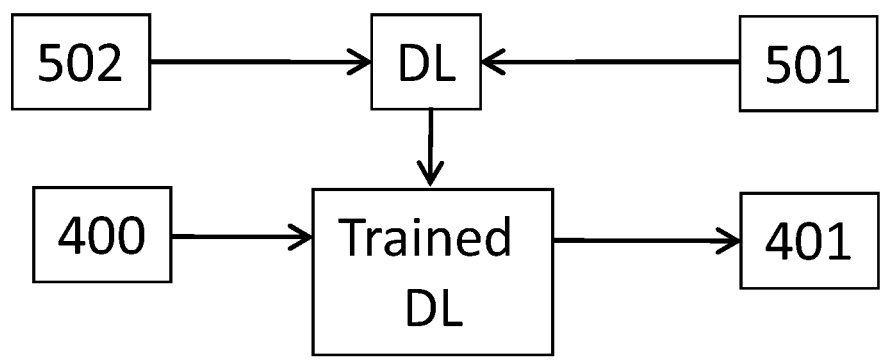
Figure 5:
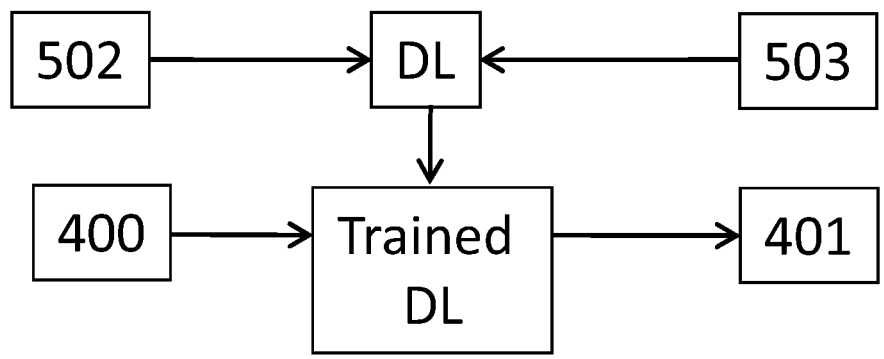
Figure 7:
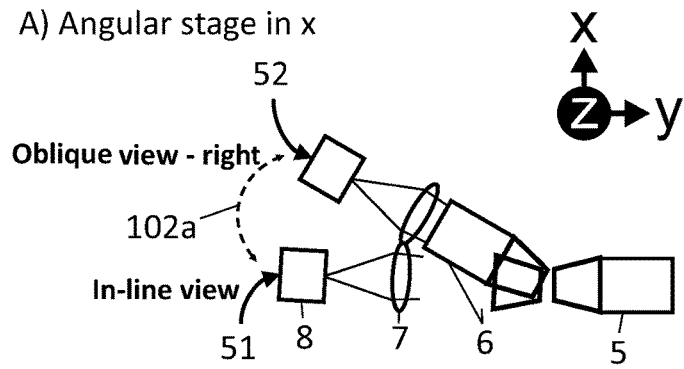
Figure 7:
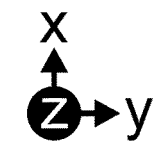
Figure 7:
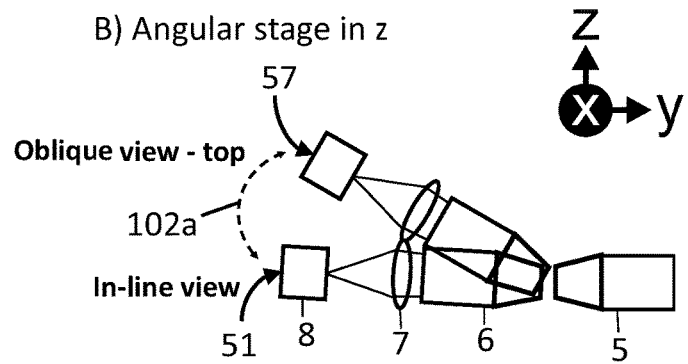
Figure 7:
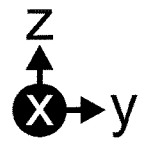
Figure 8:
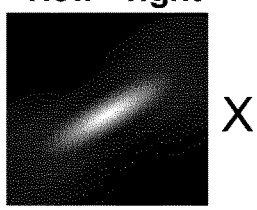
Figure 8:
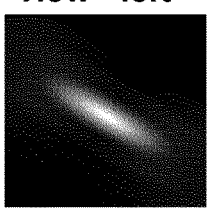
Figure 8:
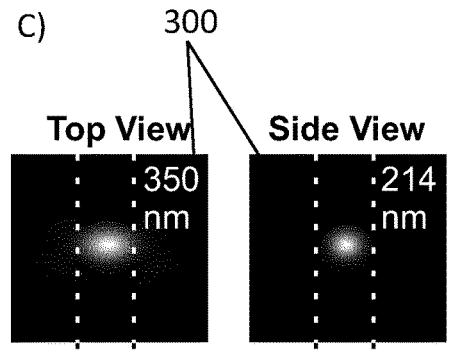
Figure 8:
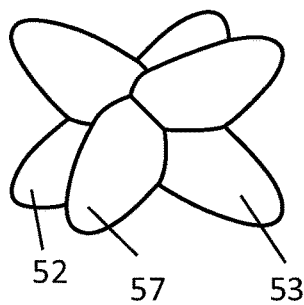
Figure 8:
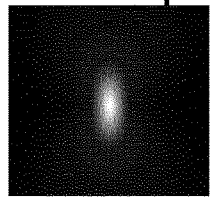
Figure 8:
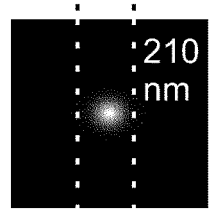
Figure 8:
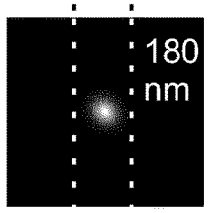

FIG. 1 a schematic illustration of the microscope system according to the invention;

FIG. 2 a schematic illustration of the microscope system with an additional imaging module;

FIG. 3 various imaging modes, particularly imaging modes that can be used for training;

FIG. 4 a block diagram depicting the work flow of training and restoration with the machine learning method;

FIG. 5 a block diagram depicting the work flow of training and restoration with the machine learning method including an additional imaging mode;

FIG. 6 Example data demonstrating the aberration compensation-capabilities of the microscope system;

FIG. 7 a schematic illustration of the azimuthal reimaging angles that can be used for multi-view fusion image generation; and FIG. 8 schematic illustration of the corresponding point spread functions used for the generation of multi-view fusion images.

In general, oblique illumination microscopy has taught the optical arrangement of an inclined illumination and a detection via a single sample imaging objective with a pair of reimaging objectives to correct the inclined imaging plane. Thus, the sample illumination objective serves the purpose of providing the light to the sample space as well as to collect light emitted in the sample space of the microscope system.

However, the maximum numerical aperture (NA) is limited to 0.76 maximum (Dunsby, Opt. Exp. Vol16, 20306-20316, 2008) with an oil immersion objective (60×, NA1.4) used for the sample illumination objective. The high numerical aperture provided by the sample illumination objective comes at the cost of a limited imaging depth into the sample and optical aberrations caused by the inclined coverslip surface to the optical axis in the inverted scheme of single-objective light-sheet. At least one constraint limits the numerical aperture for detection and 3D-imaging depth for high resolution (e.g. NA total >0.7) of the single-objective light-sheet microscope system, namely the effective intermediate magnification, M, between the sample space and the intermediate image space is mandatory to be unity in order to achieve aberration-free 3D imaging using an oblique illumination light sheet. Additionally, aberrations induced by a refractive index mismatch between the immersion oil of the immersion objective (for oil objective) and an aqueous medium for keeping a biological sample.

The requirement that the intermediate magnification, M, equals one, leads to the constraint that the illumination angle and the reimaging angle adopted by the second reimaging objective have to be the same. This in turn limits the available detection cone of the second reimaging objective, which determines the total detection NA of the microscope system.

In this invention, this problem has been solved universally to achieve aberration-free 3D-images with arbitrary intermediate magnification.

In FIGS. 1, 2, 3 and 7 a schematic embodiments of microscope systems 100 or its configurations according to the invention are depicted.

The microscope system 100 comprises an illumination module (not shown) that provides illumination light 200 (indicated with "Laser in") to the sample imaging objective 1 via a dichroic beam splitter 3 that can be configured to switch between different positions for providing illumination light 200 from different sources and to deflect collected light 201 from the sample imaging objective 1 towards a different detection system (not shown). The dichroic beam splitter 3 is transparent for the illumination light 200 and reflective for the emitted light 201 (shown as gray lines in a ray optics scheme). The illumination light 200, also referred to as excitation light, is provided to the back focal aperture of the sample imaging objective 1 such that at least a first or a second illumination mode of the microscope system 100 is generated. In the first illumination mode, the illumination in the sample space S, i.e. the side on which a sample 11 is arranged, corresponds to a wide field illumination that is particularly an illumination with little wave front curvature, so that a comparable even illumination of the sample space S is achieved.

This is particularly achieved by focusing the illumination light 200 from the illumination module to the back focal aperture of the sample imaging objective 1, particularly to a center of the back focal aperture.

In the second illumination mode the illumination light 200 is brought such to the back focal aperture of the sample imaging objective 1 that an inclined light sheet is generated in the sample space S. For this purpose, the illumination light 200 can be weakly focused at a rim portion of the back focal aperture of the sample imaging objective 1.

The inclined light sheet provides selective illumination of the sample 11. The illumination angle 101 that is the angle enclosed between the light sheet and the optical axis OA0 along the propagation direction of the light can be adjusted by shifting the illumination light closer or further apart from the rim portion of the back focal aperture of the sample imaging objective 1.

The oblique light sheet leads to an inclined excitation of the sample 11, such that light is emitted at different image depths along the optical axis OA0 of the sample imaging objective 1.

In general, the sample imaging objective's 1 optical axis OA0 defines the optical axis of the microscope system 100.

The light emitted from the sample is collected by the sample imaging objective 1 and propagates essentially along the opposite direction to the illumination light 200 independent of the illumination mode.

At the dichroic beam splitter 3 the emitted light 201 is reflected towards the first reimaging objective 5 that has its optical axis OA1 aligned with the optical axis OA0 of the sample imaging objective 1.

The first reimaging objective 5 generates an intermediate image from the emitted light in an intermediate image space IS. The second reimaging objective 6 is ideally arranged such that it collects a maximum amounts of light from the intermediate image.

The second reimaging objective 6 can be arranged with its optical axis OA2 in at least two or more positions relative to the optical axis OA1 of the first reimaging objective 5. Particularly, the second reimaging objective 6 can be swiveled with its focal point coinciding with a focal point of the first reimaging objective 5 around the optical axis OA1 of the first reimaging objective 5.

The focal point is the point of focus where collimated light would be focused on the optical axis of the objective.

The angle that is enclosed between the optical axis OA1 of the first reimaging objective 5 and the optical axis OA2 of the second reimaging objective 6 is referred to as the reimaging angle 102.

Thus, independent of the illumination mode of the microscope system 100 a detection mode 51, 52 can be adopted by the system 100, wherein the detection mode 51, 52 can be a first detection mode 51, where the optical axes OA1, OA2 of the first and the second reimaging objective 5, 6 coincide and thus the reimaging angle 102 is zero.

Any combination of an illumination mode and a detection mode form an imaging mode of the microscope system 100.

In the second detection mode 52 the optical axes OA1, OA2 of the first and the second reimaging objectives 5, 6 enclose a reimaging angle 102 larger (or smaller) than zero.

In case the intermediate magnification is not one, the reimaging angle 102 and the illumination angle 101 can be different leading to an increased light collection by the second reimaging objective 6 as the collectable light cone is larger. However, this comes at the cost of additional optical aberrations in the intermediate image.

The microscope system 100 comprises a detection module 70. In the depicted example, the detection module 70 comprises a camera 8 and an imaging lens 7 in front of said camera 8 for focusing the light from the second reimaging objective 6 to the camera 8. The camera 8 generates the recorded image of the sample 11.

As can be seen the detection module 70 is always aligned to the optical axis OA2 of the second reimaging objective 6. Thus, when the second reimaging objective 6 adopts a different reimaging angle 102, the detection module 70 moves together with the second reimaging objective 6.

In FIG. 1 in an exemplary fashion it is indicated how the detection module 70 swivels (indicated by the double arrow 9) together with the second reimaging objective 6 between the first detection mode 51 and the second detection mode 52 with an reimaging angle 102 larger than zero.

An evaluation module 200 is comprised by the microscope system 100. In the example shown it is a computer connected to the camera 8. The computer 200 receives the image recorded by the camera 8 and is configured to process said image.

For processing, the computer 200 comprises a deep learning network DL that has been trained with a first set of images recorded in a first imaging mode 501, and a second set of images recorded in a second imaging mode 502. As stated previously, the first and the second imaging mode 501, 502 each comprise one illumination mode and one detection mode 51, 52.

Thus, for example the deep learning network DL can be trained with the first set of images recorded in the first imaging mode 501, wherein the first imaging mode 501 consists of the combination of a wide field illumination mode, i.e. where the illumination angle 101 is zero and the first detection mode 51 where the reimaging angle 102 is zero.

This first imaging mode 501 serves as the ground truth for the deep learning network DL.

The second set of images is recorded with the second imaging mode 502, that could for example be an oblique illumination and oblique detection mode 52, where the illumination and the reimaging angle 101, 102 are larger than zero, but not most likely not identical.

While other combinations for the first and the second imaging mode 501, 502, 503 for training can be used, in the following the features of the microscope system 100 according to the invention are elaborated on these specific combinations of illumination and detection modes 51, 52.

It is clear that the first and the second set of images essentially comprise at least an overlapping portion of the sample 11.

The training of the deep learning network DL follows the known rules and requirements for deep learning networks known to the person skilled in the art.

When the trained deep learning network DL receives an image 400 recorded from an unknown sample and acquired in the second imaging mode 502, said image, at least due to the non-neutral intermediate magnification, i.e. the intermediate magnification deviates from one, comprises substantial optical aberrations as compared to the same image if it would be recorded in the first imaging mode 501. The trained deep learning network DL processes said image 400 such that a restored image 401 is generated by the deep learning network, wherein the restored image 401 comprises fewer amounts of optical aberrations.

Thus, the microscope system 100 is configured to generate restored images 401 particularly from images 400 recorded in oblique imaging modes 502 where intermediate magnifications are non-neutral. This allows for light sensitive imaging for which conventional oblique light sheet microscopes would not be suited.

Exemplary training procedures for the deep learning network are shown for various first and second imaging modes in FIGS. 4 and 5.

In FIG. 4 a training procedure and subsequent evaluation procedure is schematically shown. The deep learning network DL is trained with images acquired in a first imaging mode 501, and a second imaging mode 502, wherein the images acquired in the first imaging mode 501 serve as a ground truth for the deep learning network DL.

Once the deep learning network is trained, any input image 400 acquired in the second imaging mode 502 is restored by the trained deep learning network. The restored image 401 comprises fewer aberrations than the input image 400.

In FIG. 5 an alternative embodiment is shown. Here, the training procedure makes use of an imaging mode 503/(for ground truth) provided by an additional imaging module 12 that is configured to provide e.g. a superresolved images. An input image 400 acquired in the second imaging mode will be restored to an image 401 with a higher resolution than the input image 400.

In FIG. 2 an embodiment of the microscope system 100 is shown that comprises an additional imaging module 12 indicated by "External Imaging Module". This additional imaging module 12 provides additional imaging modes 503 that can be used for ground truth training set of images. Thus, the additional imaging module 12 is configured to provide at least one more first imaging mode 503 to the microscope system 100, wherein said imaging mode 503 typically serves as a ground truth during training of the deep learning network DL.

The additional imaging module 12 can for example generate images with a higher spatial, i.e. optical resolution than the second imaging mode 502 of the microscope system 100.

This has the additional benefit that the deep learning network not only generates restored images 401 with fewer optical aberrations but also restored images 401 that possibly have a higher optical resolution.

In order to engage the additional imaging module 12 the dichroic beam splitter 3 can switch from a first configuration to a second configuration where particularly the detection portion of the system 100 is governed by the additional imaging module 12.

The illumination module might stay the same.

In case the deep learning network DL is trained with superresolved images, i.e. images having particularly an optical resolution beyond the diffraction limit, the deep learning network DL essentially provides a high-resolution model for restoring the images recorded with the second imaging mode 502 that can for example be an oblique imaging mode.

In FIG. 3, several combinations of imaging modes 501, 502 that can be used for training the deep learning network DL are shown. In the following always the first imaging mode 501 is used for generating images serving as the ground truth for the deep learning network DL.

In FIG. 3A, the first imaging mode 501 consists of the wide field illumination mode and the wide field detection mode 51; that is both, the illumination angle 101 and the reimaging 102 angle are zero. The second imaging mode 502 consists of the oblique illumination mode, i.e. the illumination angle 101 is larger than zero and the detection mode has a reimaging angle 102 of zero degree.

While a training with such imaging modes seem counterintuitive, the such trained deep learning network DL can successfully restore images recorded in oblique imaging mode where both, the illumination angle and the reimaging angle are non-zero.

In FIG. 3B, the first imaging mode consists of the wide field illumination mode and the wide field detection mode 51; that is both, the illumination angle 101 and the reimaging angle 102 are zero. The second imaging mode 502 consists of the oblique illumination mode, i.e. the illumination angle 101 is larger than 0 and the detection mode 52 has a reimaging angle 102 larger than zero degree.

This trained learning network can restore oblique illumination images having non-neutral intermediate magnification as elaborated above.

In FIG. 3C, the first imaging mode 501 is provided by the additional imaging module 12 and provides some additional imaging mode, e.g. confocal imaging or superresolution imaging, provided by the additional imaging module, as elaborated previously. The second imaging mode consists of the oblique illumination mode, i.e. the illumination angle 101 is larger than zero and the detection mode has a reimaging angle 102 larger than zero degree.

In FIG. 6 an example measurement is depicted. On the left panel (A) an image 400 is shown that is recorded in oblique imaging mode 502, i.e. with an illumination angle and a reimaging angle larger than zero. The aberrations due to the non-neutral magnification can be clearly seen. Two regions have been zoomed in where different kinds of aberrations are visible.

After processing said image ("Input") with the accordingly trained deep learning network (DL-network), the restored image 401 ("Prediction") does not show these aberrations anymore, as can be seen in the right panel (B). The zoomed regions in panel (B) do not exhibit any aberrations any more, demonstrating broad applicability of the microscope system and the method according to the invention.

An exemplary combination of optical components for the microscope system 100 is given in the following. For example the microscope system according to the invention has an effective numerical aperture in oblique imaging mode, of up to 1.07 or higher, when a water immersion objective (NA 1.2/WD 0.3 mm, commercially available objective) is used as the sample illumination objective.

Alternatively, an effective numerical aperture of up to 0.85 using a water immersion objective (NA1.1/WD 2.7 mm, commercially available objective) as the sample imaging objective can be achieved.

One aspect of the invention also relates to the fusion of multi-view oblique angle images. This is shown in FIGS. 7 and 8.

For this purpose, the microscope system in configured to generate the oblique light sheet at different azimuthal illumination angles such that the sample can be sequentially imaged with a plurality of light sheets, having the same illumination angle. The azimuthal illumination angle is the angle the light sheet is rotated around the optical axis of the sample imaging objective, i.e. the azimuthal angle extends in the plane orthogonal to the optical axis of the sample imaging objective.

Similarly and correspondingly the system is configured to rotate the second reimaging objective around an azimuthal reimaging angle such that oblique imaging is performed at the corresponding orientations of the illumination mode and the detection mode.

The azimuthal reimaging angle therefore extends along a plane orthogonal to the optical axis of first reimaging objective.

While the trained deep learning network restores each recorded image for the different azimuthal angle configurations the system is further configured and adapted to generate a set of images recorded at different azimuthal illumination and corresponding azimuthal reimaging angles a multi-view fusion image featuring a higher resolution than each single image.

The combination of first restoring and then fusing the images provides significant advantages for light sensitive high-resolution 3D-imaging of biological samples.

FIG. 7 shows a second imaging mode with a first azimuthal reimaging angle 102a (left panel, A) and another second imaging mode 502 with a second azimuthal reimaging angle 102b (right panel, B). Not shown are the corresponding azimuthal illumination angles.

In FIG. 8 it is exemplarily shown how a fusion of three oblique light sheet images results in a multi-view fusion image by means of the improved underlying/resulting point-spread function of the system. In the example the system adopts three different azimuthal configurations 52, 57, and 53 giving rise to three different point spread functions. In panel A) a three-dimensional rendered view of the three point spread functions 52, 57, 53 is depicted. In panel B) the single point spread functions 52, 53, 57 as recorded for different azimuthal reimaging angles (left, right and top), wherein the (magnitude) of the reimaging angle remains constant, as observed by the detection module. The illumination angle was set to 60° and the azimuthal illumination angle is rotated in accordance with the azimuthal reimaging angles.

The illumination angle was set to 60°, but could also be set to a lower value such as 45°.

In panel C) of FIG. 8 the fused effective point spread function is depicted for a combination of the point spread functions 52 and 53 (upper panel of panel C) and for fusion of all three point spread functions 52, 52, 57 (lower panel of panel C).

As can be seen the size of the fused point spread function is reduced by the fusion such that an increased optical resolution can be achieved while maintaining the larger effective numerical apertures possible with the system according to the invention.

Fusion can be achieved by multiplying Fourier-transformed images and re-transforming the resulting image back to real-space.

It is clear that also a dual view fusion for example by using only the (azimuthal) illumination and reimaging angles corresponding to the point spread functions 52 and 53 can be achieved.

In comparison, the lateral width (FWHM) of the effective point spread functions are given as follows for a 60° illumination angle and effective numerical of 1.07:

No fusion (single reimaging angle): 350 nm
Dual-view fusion: 254 nm
Triple view fusion: 210 nm

The invention claimed is:

1. A microscope system (100) configured to record images in at least a first and a second imaging mode (501, 502), wherein the microscope system (100) comprises the components of:
a sample imaging objective (1) arranged to provide illumination to a sample space(S) of the microscope system (100) and to collect light (201) from a sample (11) arranged in the sample space(S), wherein an optical axis of the system (OA) aligns with an optical axis (OA0) of the sample imaging objective (1),
an illumination module configured and arranged to emit light (200) to the sample imaging objective (1) for illuminating the sample space(S),
a first reimaging objective (5) and a second reimaging objective (6), wherein an optical axis (OA1) of the first reimaging objective (5) aligns with the optical axis of the system (OA), and wherein the first reimaging objective (5) is arranged and configured to generate an intermediate image of the sample space(S) in an intermediate image space (IS) and wherein the second reimaging objective (6) is arranged and configured to image the intermediate image,
a detection module (70) arranged and configured to detect and record light collected by the second reimaging objective (6), wherein the detection module (70) is arranged along an optical axis (OA2) of the second reimaging objective (6),
an evaluation module (200) comprising a machine learning method (DL), wherein the machine learning method is trained with a first set of images of a sample and a second set of images of the same sample, wherein the first set of images has been acquired in the first imaging mode (501) of the microscope system (100) and wherein the second set has been acquired in the second imaging mode (502) of the microscope system (100), wherein upon acquisition of an image (400) in the second imaging mode (502) the trained machine learning method (DL) is configured to generate and to output a restored image (401) from the image (400) acquired in the second imaging mode, wherein the restored image (401) comprises fewer aberrations than the image (400) acquired in the second imaging mode (52, 53, 57),
wherein the microscope system (100) is configured to adopt a first and a second illumination mode, wherein in the first illumination mode an optical axis of the illumination module and the optical axis (OA0) of the sample imaging objective (1) align and in the second illumination mode an oblique light sheet illumination at the sample space is generated such that illumination propagates along an illumination angle (101) relative to the optical axis (OA0) of the sample imaging objective (1), wherein the microscope system (100) is further configured and arranged to adopt a first detection mode (51) and a second detection mode (52), wherein in the first detection mode (51) the optical axis (OA2) of the second reimaging objective (6) aligns with the optical axis (OA1) of the first reimaging objective (5), wherein in the second detection mode (52) the optical axis (OA2) of the second reimaging objective (6) encloses a reimaging angle (102) with the optical axis (OA1) of the first reimaging objective (5), wherein the first imaging mode (501) comprises a combination of the first or the second illumination mode with the first or the second detection mode (51, 52) and wherein the second imaging mode (502) comprises another combination of the first or the second illumination mode with the first or the second detection mode (51, 52), wherein the microscope system (100) is configured to adopt a third imaging mode, wherein the third imaging mode (503) comprises yet another combination of the first or the second illumination mode with the first or the second detection mode (51, 52), and wherein upon acquisition of an image (403) in the third imaging mode, the machine learning method (DL) that has been trained with the first set and the second set of images acquired in the first or second imaging mode (501, 502) is configured to generate and to output a restored image (401) from the image (403) acquired in the third imaging mode, wherein the restored image (401) comprises fewer aberrations and/or a higher optical resolution than the image (403) acquired in the third imaging mode.

2. The microscope system (100) according to claim 1, wherein the first illumination mode, is a wide field illumination mode and the second illumination mode is, such as an oblique selective plane illumination mode.

3. The microscope system (100) according to claim 1, wherein an intermediate magnification, particularly an intermediate lateral magnification of the sample space(S) in the intermediate image space (IS) is smaller than one, particularly smaller than 0.9 more particularly smaller than 0.8, particularly wherein the intermediate magnification is smaller than one, when the microscope system (100) adopts the second illumination mode together with the second detection mode (52), wherein the trained machine learning method is trained such that any optical aberration that is caused by the intermediate magnification being smaller than one is compensated in the restored image.

4. The microscope system (100) according to claim 1, wherein the reimaging angle (102) is smaller than the illumination angle (101), particularly wherein a sum of the reimaging angle (102) and the illumination angle (101) is smaller than 90°, particularly smaller than 80°, particularly wherein if the illumination angle (101) is 45° the reimaging angle (102) is smaller than 45°, particularly wherein if the illumination angle (101) is 60° the reimaging angle (102) is smaller than 30°.

5. The microscope system (100) according to claim 1, wherein the microscope system (100) is configured to adopt at least two illumination angles (101) different to 0°, particularly wherein the first and the second illumination angle are between 30° and 60°, particularly wherein each illumination angle forms a second illumination mode.

6. The microscope system (100) according to claim 1, wherein the microscope system (100) is configured to adopt at least two reimaging angles (102) different to 0°, particularly wherein the first and the second reimaging angles are between 15° and 45°, particularly wherein each reimaging angle forms a second detection mode.

7. The microscope system (100) according to claim 1, wherein the microscope system (100) is configured to adopt at least a first and a second azimuthal illumination angle when the microscope system (100) adopts the second illumination mode, wherein first and the second azimuthal illumination angle each cover an area comprised by a plane orthogonal to the optical axis (OA0) of the sample imaging objective (1), particularly wherein the first and the second azimuthal illumination angle differ by at least 60°, particularly by at least 90°, more particularly by 180°, particularly wherein the illumination angle (101) is the same for the first and the second azimuthal illumination angle.

8. The microscope system (100) according to claim 1, wherein the microscope system (100) is configured to adopt at least a first and a second azimuthal reimaging angle (102*a*, 102*b*) when the microscope system (100) adopts the second detection mode (52, 53, 57), wherein the first and the second azimuthal reimaging angle (102*a*, 102*b*) each cover an area comprised by a plane orthogonal to the optical axis of the first reimaging objective, particularly wherein the first and the second azimuthal reimaging angle (102*a*, 102*b*) differ by at least 45°, particularly by at least 90°, more particularly by 180°, particularly wherein the reimaging angle is the same for the first and the second azimuthal reimaging angle (102*a*, 102*b*).

9. The microscope system (100) according to claim 7, wherein the microscope system (100) is configured to acquire for each of the at least two azimuthal illumination angle and each corresponding azimuthal reimaging angle (102*a*, 102*b*) an image.

10. The microscope system (100) according to claim 9, wherein the evaluation module (200) or an additional computer is configured to generate a multi-view fusion image (300) from the at least two acquired images by fusing the acquired images, wherein the multi-view fusion image has a higher spatial resolution than the single images recorded with the azimuthal illumination angle and the corresponding azimuthal reimaging angle (102*a*, 102*b*).

11. The microscope system (100) according to claim 1, wherein between the sample imaging objective (1) and the first reimaging objective (5), relay lenses (2, 4) are arranged, wherein the relay lenses (2, 4) are configured such that the intermediate magnification is smaller than one.

12. The microscope system (100) according to claim 1, wherein the microscope system (100) comprises an additional imaging module (12) for generating images associated to the first imaging mode, wherein the additional imaging module shares at least the sample imaging objective (1) of the system (100), wherein the additional imaging module (12) is a
   confocal imaging module configured to record confocal images from a sample in the sample space,
   a superresolution microscopy module configured to record and generate superresolution images, such as a STED, STORM, PALM or SOFI, SIM module.

13. The microscope system (100) according to claim 11, wherein the machine learning method is or has been trained by at least one of the following combinations of imaging modes, wherein the first set of images acquired in the first imaging mode is a ground truth for the machine learning method (DL) and the second set of images acquired in the second imaging mode is a source for the machine learning method input:
  a. the first imaging mode consists of the first illumination mode, particularly the wide field illumination mode and the first detection mode, and wherein the second imaging mode consists of second illumination mode for oblique illumination and the first detection mode, particularly wherein the third imaging mode consists of the second illumination mode and the second detection mode;
  b. the first imaging mode consists of the second illumination mode and the second detection mode, and wherein the second imaging mode consists of the second illumination mode for oblique illumination and the first detection mode, particularly wherein the third imaging mode consists of the second illumination mode and the second detection mode;
  c. the first imaging mode consists of the first illumination mode, particularly the wide field illumination mode, and the first detection mode, and wherein the second imaging mode consists of second illumination mode for oblique illumination and the second detection mode;
  d. the first imaging mode consists is an imaging mode provided by the additional imaging module, and wherein the second imaging mode consists of second illumination mode for oblique illumination and the second detection mode, particularly wherein the restored image generated by the machine learning method comprises a higher optical resolution than the image acquired in the second imaging mode.

14. A Method for restoring a microscope image acquired on a microscope system (100) according to claim 1, the method comprising the steps of:
   train a machine learning method with a first set and a second set of images corresponding to a first and a second imaging mode of the microscopes system;
   acquiring an image in the second imaging mode;
   restoring the acquired image with the trained machine learning method such that the restored image comprises fewer aberrations and/or a higher optical resolution than the acquired image.

* * * * *